INVENTOR.
HARRY A. WILCOX
BY Harold A. Dixon

June 8, 1965 H. A. WILCOX 3,188,422
TREADLE-OPERATED TRAFFIC DETECTOR HAVING MEANS
FOR REFILLING WHILE MOUNTED IN A ROADWAY
Filed April 20, 1961 2 Sheets-Sheet 2

INVENTOR.
HARRY A. WILCOX
BY
Harold A. Dixon

United States Patent Office 3,188,422
Patented June 8, 1965

3,188,422
TREADLE-OPERATED TRAFFIC DETECTOR HAVING MEANS FOR REFILLING WHILE MOUNTED IN A ROADWAY
Harry A. Wilcox, Westport, Conn., assignor to Laboratory for Electronics, Inc., Boston, Mass., a corporation of Delaware
Filed Apr. 20, 1961, Ser. No. 104,393
1 Claim. (Cl. 200—86)

This invention relates to roadway traffic detectors and more particularly relates to an improved form of such detectors and to the methods of making this improved detector.

One form of a traffic detector or treadle switch includes two parallel electrical contact plates spaced from each other and completely enclosed as by molding within a rubber casing with a cavity or space between the contact plates. The rubber prevents water from reaching the contacts, provides resiliency and presents a long lasting surface to the vehicles passing over it. Vehicles rolling over the detector actuate it by depressing one of the contact plates through the cavity into contact with the other contact plate thereby closing an electrical circuit. Removal of the vehicle wheel results in a return of the contacts to their parallel open positions due to the natural resiliency of the rubber.

In its normal operation the traffic detector is placed within the roadway usually with its top surface flush with the roadway. It is subjected to atmospheric pressure on its exterior surface, but this pressure is insufficient to close the contacts because of the opposing air pressure (usually approximately atmospheric pressure) within the detector cavity and the supporting structure of the contact plates.

The usual method for making such detectors has been by positioning the contact plates parallel to each other in a mold and separated from each other, as by a mandrel; subsequently uncured rubber is positioned in the mold adjacent the plates, the mold is closed and the rubber is cured by heat to form a molded detector. In this process, care is taken to insure that the contact plates are separated by an air space or cavity and that the mandrel prevents rubber from flowing into this cavity. The mandrel is then withdrawn from one end of the detector while the rubber is cooling, and the open end of the detector is then closed by rubber in an additional step of the process.

While many of these detectors have operated successfully for many years, it has been found that some of these detectors will become defective prior to their expected life span. The defect may be a shorting or permanent touching of the plates or the development of high resistance contact surfaces on the plates which prevent the passing of a sufficient operating current to operate the relay or other device used as terminal equipment. The short circuit condition is recognized as a collapsing of the detector with one contact plate being flexed through the air gap cavity into contact with the other contact. Such shorting or high contact resistance may develop after the detector has been used for only a short time (six months for example) if it has received a large number of actuations (such as one million) at a vehicle toll station. Since these detectors are positioned within the roadway it is time consuming and expensive to change a defective detector. Consequently, only the best traffic detectors are satisfactory.

While there have been many suggestions as to the cause of this short circuiting, no satisfactory explanation or solution has heretofore been proposed.

Investigation of this problem according to this invention has resulted in the discovery that such defective detectors have a much smaller percentage of oxygen by volume in the cavity between the plates than is present in the atmosphere. Since the detectors were originally manufactured in the presence of air and were completely enclosed, this absence had to be explained. In many cases after only six months of operation, less than half of the normal percentage of oxygen in air remains in the cavity.

While this invention does not propose to explain all of the, or the exact, chemical reactions which occur in a traffic detector to decrease the percentage of oxygen, or cause it to assume a smaller volume, the invention does propose to solve the problem by preventing these reactions or losses.

One reaction that appears to occur is oxidation of the iron contacts to produce ferric oxide. Another explanation may be that nitrous peroxide is produced from a combination of the nitrogen and oxygen of the air in the presence of the arc which is present in such switches.

Further reduction of oxygen may occur as a result of chemical reaction with the rubber or due to a permeation or diffusion of oxygen through the rubber. It is known that such rubbers or other elastomers contain carbon which may react with oxygen; and also, it is known that gases such as $CO_2$ and $O_2$ may permeate the rubber.

A further factor to be considered is that such traffic detectors are positioned in a roadway and subjected to the heat of summer and the cold of winter. Accordingly the air within the cavity responds to well known gas laws as a function of temperature.

During the winter the air molecules within the cavity tend to be less active so that at any given pressure, the volume which they would assume would be less than their summer volume.

Consequently, the separation of the contacts is less in the winter than in the summer. Since these detectors are subjected to external atmospheric pressure tending to close the contacts and are subjected to the internal pressure within the cavity tending to hold the contacts open, the losses of oxygen within the cavity due to oxidation, absorption other chemical reactions as discovered in this invention will result in the external atmospheric pressure shorting the contacts.

In such an enclosed switch, these losses are permanent and may by themselves result in a shorting of the contacts regardless of temperature.

Another problem which has existed in the traffic detector art has been to make traffic detectors which require a particular vehicle pressure to actuate the contact. For example if it is desired to have automobiles actuate a detector, the contacts have a certain spacing. If it is desired that only trucks having a certain weight actuate a detector, a different detector must be used in which the spacing of the contacts is greater than that used for automobiles or a stiffer steel is used. In making applicant's preferred form of detector he can, using the same nominal spacing of contacts, make a detector for either purpose.

Accordingly, it is an object of the invention to provide an improved traffic detector.

It is another object to provide an improved method of making, converting or repairing traffic detectors.

It is an additional object to provide a traffic detector having a relatively inert gas in the space between the contacts.

Another object is to provide a traffic detector in which the inert gas pressure between the contacts is different from atmospheric pressure by a predetermined amount depending upon the force desired for actuation of the detector so that detectors having the same nominal or original spacing of contacts may require different forces to be actuated in dependence upon the gas pressure.

A further object of the invention is to provide a novel method for inserting gas into a traffic detector or for determining the pressure therein by the use of hypodermic needles.

The foregoing and further objects are satisfied according to this invention by removing the air (particularly oxygen) which is normally present and by inserting nitrogen or other equivalent gases in the cavity between the contact plates of the traffic detector at the desired pressure depending upon the degree of actuating force required. Nitrogen and other equivalent gases, as for example argon in the cavity provide a traffic detector in which the volume of its cavity in its non-actuated condition for any given temperature remains substantially constant over its normal life span. These relatively inert gases have substantially the same variation in volume with variations in temperature as air but are relatively inactive with respect to corrosion of the iron contacts or absorption of the gas by the rubber.

Accordingly such an improved form of detector does not lose any gas from its cavity; therefore the internal pressure within such detector is always sufficient to oppose the external atmospheric pressure thereby preventing a short circuit. The invention is not limited to nitrogen or argon in such detectors since other equivalent gases may be used. Such gases have previously been used in switches for a variety of purposes but it does not appear that they have been used in switches in which their loss would result in a closure of the switch particularly by external atmospheric pressure.

Also if the pressure of the nitrogen inserted is above or below atmospheric pressure, the detector will respond to higher or lower vehicle forces. In this way a single type of detector may be made to serve any one of a plurality of functions depending upon the nitrogen pressure.

A preferred method of inserting the nitrogen in such a completely enclosed detector employs a hypodermic needle which is sharp and small enough to provide an opening through the rubber for the passage of the nitrogen into the cavity but which opening will be sealed by the rubber itself when the needle is withdrawn.

Figure 1:
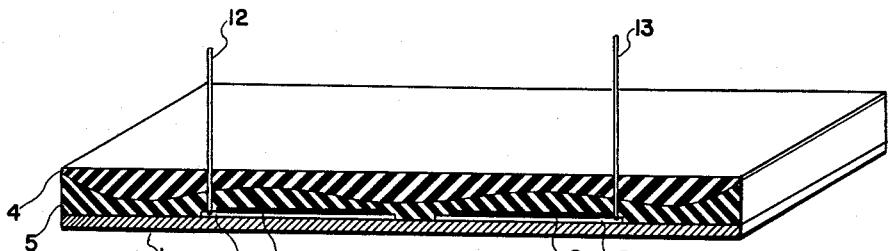
FIG. 1 shows a cross section of a typical roadway vehicle detector showing a method of inserting and removing gas between the contact plates.

FIG. 1 illustrates a cross-section of a typical vehicle detector. It includes a fixed electrical contact plate 1 above which are mounted movable or flexible contact plates 2 spaced from plate 1 by air gaps or cavities 3. Connecting wires (not shown) would be connected to contacts 1 and 2 for connection to traffic apparatus as is well known. A rubber casing hermetically seals the contacts and supports the movable contact; this rubber casing may include a long wearing rubber section 4 and a more flexible rubber section 5 molded to the movable contacts 2 thereby providing cavities 3 between the contacts while preventing air, roadway water, or grease from entering between the contacts. Many compositions of rubber are known and while we have shown two types, it is obvious that only one type of rubber may be used. These detectors are elongated (generally 6 to 10 feet) to extend a substantial portion of the width of a traffic lane.

When such a detector is placed in the roadway, vehicles passing over the exposed top surface of the pad depress the rubber and contact plate 2 downward into contact with plate 1 thereby closing an electrical circuit in the traffic control apparatus to which it is connected. The detector may be mounted within the roadway by bolts and nuts or other connecting means as is well known.

Normally plates 1 and 2 are parallel to and spaced from each other in their non-actuated condition. The external pressure of the atmosphere on the top surface of the rubber and plate 2 is substantially balanced by the combined effect of internal atmospheric pressure of the air in cavity 3 and the normal resistance to bending of the rubber and steel.

The plates 1 and 2 in FIG. 1 are generally steel or other conducting materials. Still other vehicle detectors may operate on principles other than the moving of one contact into contact with another contact due to the weight of the vehicle. However, the invention is applicable to all vehicle detectors and systems which completely enclose a gas and whose operation would be impaired by the loss of some fraction of that gas.

Two fine small diameter hollow needles 12 and 13, which may be hypodermic needles, are shown inserted through the rubber and into the cavities to supply nitrogen and remove air although one needle is sufficient for both purposes if a vacuum pump were used to remove the air before inserting the nitrogen. Tanks of nitrogen, suction equipment, pressure measuring and other associated control means are not shown for convenience of description. The nitrogen flows through one needle, between the contact plates, and forces the air out of the other needle; communication is available between the cavities. However a single needle may be used first to remove the air and subsequently to insert the nitrogen. When the process is completed, pressure reading may be taken at needle 13 to insure sufficient pressure of nitrogen within the detector. When the needles are removed, the rubber 4 and 5 being sufficiently elastic returns to fill the space previously occupied by the needle and provides a seal against the nitrogen. Other sealing means may be used if desired. However, it has been discovered that the rubber provides a sufficient seal in itself if a fine needle is used.

Of course if the two cavities are not connected, the nitrogen may be inserted separately into each cavity. This may have certain advantages in that the pressure of one cavity may be made to differ from that of the other if desired.

Hollow needles, if of small enough diameter, do not remove any rubber when they are pushed through the rubber into the cavity, and when withdrawn, the rubber which has merely been pushed aside, comes together again to seal the opening. It has been found that a needle of size 22 (outside diameter of .028 inch) is small enough to act in this manner, for the usual rubber detector while a larger needle, such as size 18, (outside diameter of 0.42 inch) is likely to cut out a tiny cylinder of rubber when the needle is inserted. This blocks up the opening of the needle. The pressure of the gas being introduced may eject this tiny cylinder of rubber into the cavity of the detector, or the vacuum pump may suck it back out of the needle, so the process may sometimes be successfully completed even if such larger needle were used. However, when the needle is withdrawn, a tiny hole will be left in the rubber casing which must then be sealed up with cement or by other means. However, the use of a proper size needle, such as #22 for instance, eliminates this problem because it does not remove any rubber, and can therefore be withdrawn without the necessity for further sealing procedures.

Figure 2:
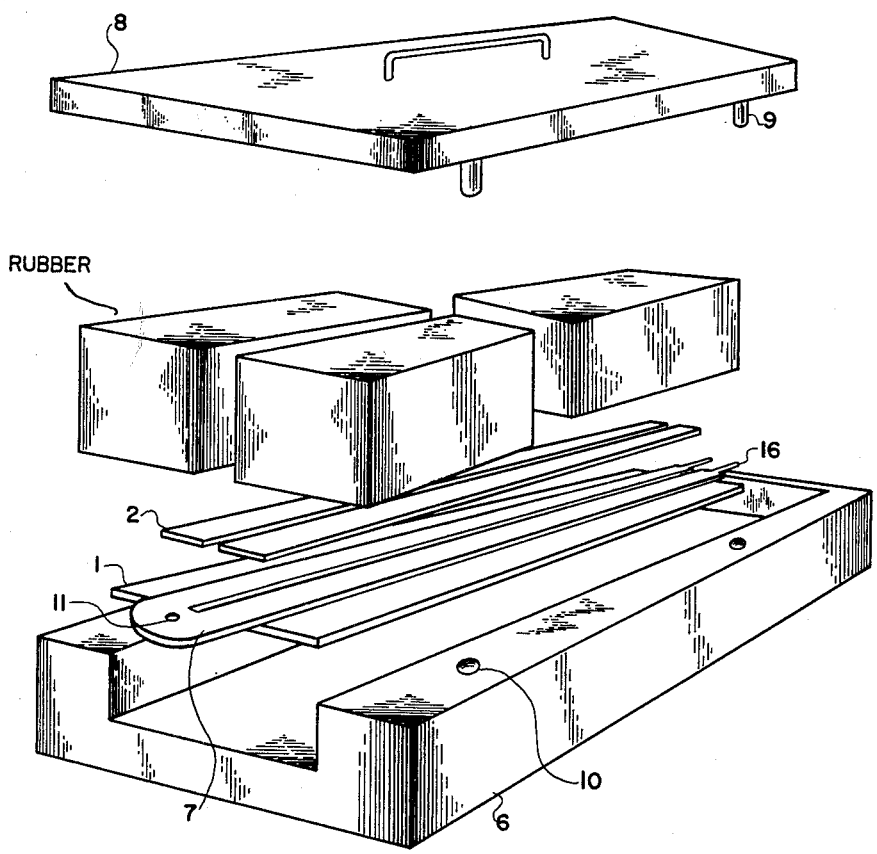
FIG. 2 shows in exploded view the position of the elements in a method of molding such traffic detectors.

FIG. 2 illustrates in an exploded view a method of molding such detectors. First the base electrical contact plate 1 is laid in the bottom half of the mold 6. Then a mandrel 7 is positioned above on top of the plate 1, and plates 2 are positioned on top of the mandrel. Thus the mandrel serves as a spacer to provide the space which after the mandrel is withdrawn will form the cavity 3 of the detector.

Subsequently pieces of uncured rubber of the desired formulations and properly shaped for the purpose are placed on top of the contacts 2 and a cover or top half 8 of the mold having dowel pins 9 which engage dowel holes 10 closes the mold; the contact plates have previously been coated with an adhesive cement. The mold is then inserted into a press (not shown) for heating and closing the top and bottom halves of the mold so that the rubber forms about the plates.

After the rubber has been cured, the detector is removed from the mold and the mandrel is pulled out by attaching a hook for example at opening 11. Insulating strips are then placed between the contact plates to support them at the open end of the detector from which the mandrel has been removed. Uncured rubber is then placed at the open end after proper preparation of surfaces; the openings are then sealed by curing this rubber, using, for example, an auxiliary mold. The insulating strips prevent rubber from flowing between the contacts under the pressure of the mold since this would prevent electrical contact between plates. Extensions 16 are shown on the mandrel to extend the cavity beyond the top contact plate as will be seen more clearly in FIGS. 4 and 5.

The invention provides a novel detector and methods for inserting relatively inert gases which have a low absorption by the rubber and which do not oxidize, or otherwise chemically combine with the iron contacts or other elements in the presence of an arc. During manufacture of the detector this gas may be inserted as a step in the molding process or the detector may be made to facilitate a later introduction of such gas; examples of the latter will be shown in FIGS. 2–5.

Alternatively the gas, preferably nitrogen, may be inserted into the detector when it is about to be sold or as a repair procedure for detectors which have failed. In such a case the apparatus and method for inserting the gas includes the use of a fine hollow or hypodermic needle, the top of which is inserted through the rubber into the cavity air space as shown in FIG. 1; the needle being sufficiently fine that the rubber provides a seal against escape of the nitrogen. Similarly pressure readings may be taken with the same needle and the nitrogen flow may continue until the desired pressure is reached. This internal pressure would normally be atmospheric pressure to oppose the external pressure of the atmosphere on the plate 2. However, the internal pressure may be above or below the atmospheric pressure as desired so that a particular force may be required to actuate the detector.

While the use of hypodermic needles is an effective method of flowing the inert gas into the detector, this gas may also be inserted during the process of making the detector.

One suggested method is to insert the gas after the mandrel is withdrawn and the detector has cooled. One such method would be to insert a hollow tube between the contacts and flow the gas into the cavity. Since the cavity has a height only of the order of $\frac{1}{16}$ inch and may be eight or ten feet long, it may be desirable that the tubing include a flattened or rectangular tube of thin metal or plastic sheeting to provide a maximum of gas flow. A further improvement would include supporting or reinforcing rods or other structure for reinforcing such a long flattened or rectangular tube. Still a further embodiment would include a plastic sheeting covering a long thin sheet of metal which is thinner than the mandrel. The gas to be inserted then passes down the tubing or between the long metal sheet and the plastic covering and into the cavity depending upon the selected embodiment. The use of plastic tubing has certain advantages; one of which is that it may expand somewhat when within the cavity under the pressure of the gas flowing down the tubing thereby permitting a greater and more rapid flow of gas into the cavity than would be available with metal or other substantially rigid wall tubing.

Of course since the tubing will generally be inserted into the whole length of the cavity, it is desirable to remove the tubing gradually as the cavity is being filled. Also it should be noted that gases such as nitrogen have substantially the same density as air, so that there will be only a slight diffusion loss of the nitrogen from the cavity at the open end if the detector is handled carefully and the open end is promptly closed.

While FIG. 1 shows one type of traffic detector it will be obvious that in many detectors it may be difficult to insert the needle into the cavity.

Figure 3:
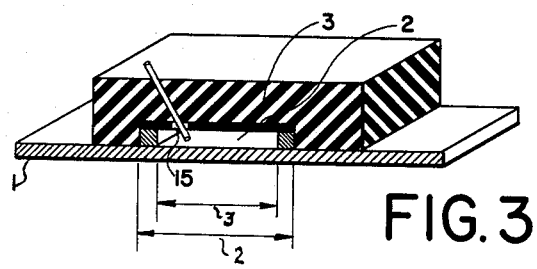
FIG. 3 illustrates a method for inserting nitrogen into a second form of detector which is shown only in part.

For example in one form of detector as partially shown in FIG. 3, the top metallic contact plate 2 may completely enclose the cavity 3 so that the needle could not easily be inserted into the cavity from the top. Entry from the side would be difficult because of the width of rubber on the side and the small cavity height as is clearly evident in FIG. 1.

Accordingly, it is suggested that a hole 15 as shown in FIG. 3 may be drilled in plate 2 at a predetermined point before the molding operation. Subsequently when the detector is completed and the rubber covers the hole as shown in FIG. 3, a hypodermic needle may be inserted through the top rubber surface and through the hole into the cavity since the exact location of this hole will be known.

Figure 4:
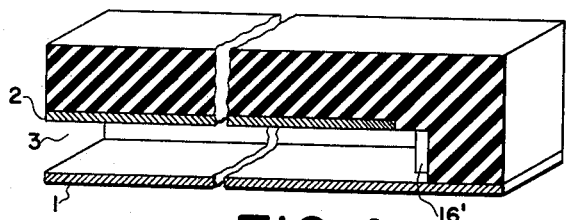
FIG. 4 illustrates in an enlarged sectional view, the extension of the cavity at one end which may be provided by a mandrel.

Still a further method to simplify entry into the cavity with the needle is suggested in FIG. 4. This method provides an extension of the cavity 16' beyond the end of plate 2, so the hypodermic needle can be inserted into the cavity from the top surface, or from the end of the detector.

Figure 5:
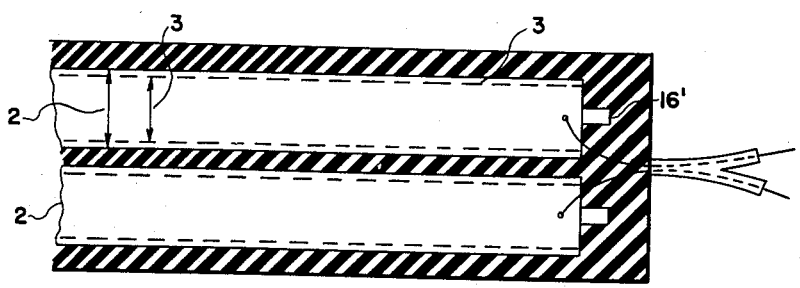
FIG. 5 illustrates a top plan view of a detector with a cavity extension as in FIG. 4.

For example, as shown in FIG. 2 the mandrel has been provided with an extension 16 preferably on its end; thus the cavity 3 will be extended at 16' in FIG. 4 and FIG. 5 beyond the end of the top contact plate 2. Subsequently a needle may easily be inserted into the air gap at that extension point to fill the detector with the inert gas. The needle may be inserted from the top of FIG. 4 and FIG. 5 since now the cavity extends at 16' beyond the top contact plate 2.

FIG. 5 illustrates a top plan view in section taken along the top plate of a detector of the type shown in FIG. 3 in which the cavity has been extended as in FIG. 4. Accordingly the top contact plate 2 appears in solid lines surrounded by the rubber along the sides and at the ends. Connecting wires are shown connected to plates 2 for connection to traffic control equipment (not shown). The cavity 3 between plates 1 and 2 is shown in dotted lines. The cavity has been extended at 16' so that the cavity extends closer to the right end by the provision of an extension on the mandrel as discussed in FIG. 2. Thus in this form of detector, a hypodermic needle may be inserted from the top or right of the detector into the cavity extension 16'.

The arrow headed lines of FIG. 5 indicate that the contact plate and cavity dimensions of FIG. 5 are the same as those of FIG. 3; the plate 2 being wider than the cavity 3; this is in contrast with the structure shown in FIG. 1 in which the cavity 3 is wider than the plate 2.

Other obvious alternatives for extending the cavity as shown at 16' would be to provide one way valves such as are used on tires. However, external connections are to be avoided where possible because of the possibility of damage. Accordingly, internal extensions are preferred.

Further considerations in the solution of these problems include an analysis of the properties of rubber. Here it should be mentioned that while the term rubber is used throughout the specification, we are referring to any type of elastomers including synthetic products having substantially the same characteristics as rubber and not merely to a product which results as a coagulation of latex.

Having thus described a preferred detector and the methods of making it, numerous other equivalent forms of the invention will be obvious to those skilled in the art. Accordingly the invention is defined in the following claim.

I claim:

A treadle-operated traffic detector for mounting in a road surface and actuation by traffic passing thereover, said detector comprising a first substantially rigid and flat metal base plate, a second substantially flat flexible metal electrical contact plate mounted in substantially parallel position and closely above said first plate and engageable therewith, both said first and second plates having large surface area in relation to thickness with said second plate having an area smaller than said first plate, said second plate overlying the central part of said first plate and leaving uncovered a strip portion of said first plate adjacent the edges of the latter, a resilient insulating casing attached to said first plate along said strip portion enclosing and supporting said second plate to maintain said second plate normally spaced closely from said first plate thereby forming a thin cavity of large area between the plates and said casing, said thin cavity lying between said first and second plates wherein said second plate is depressed into contact with said first plate by pressure through the upper part of said casing, means in said casing for filling the thin cavity while the detector is mounted in a road surface in operative condition comprising an extended cavity in the casing over said strip portion and outside the edge of the second plate and contiguous with said thin cavity, and said means constituting an access for a needle to be inserted into said cavity by penetration of said casing, said needle serving as a hollow tube for introduction of gas into said cavity whereby the gas pressure is controlled and the sensitivity of the detector is adjusted, and an electrical conductor connected with said second plate and extending through said casing for external electrical connection.

References Cited by the Examiner
UNITED STATES PATENTS

| | | | |
|---|---|---|---|
| 1,951,565 | 3/34 | Sonnett | 137—223 |
| 1,974,378 | 9/34 | Nicoll | 137—223 |
| 2,156,974 | 5/39 | Doan | 200—144 |
| 2,176,565 | 10/39 | Boynton | 137—223 |
| 2,319,567 | 5/43 | Vegell | 141—1 |
| 2,611,049 | 9/52 | Roby | 200—86 |
| 2,648,476 | 8/53 | Kennedy | 141—1 |
| 2,780,693 | 2/57 | McClellan | 200—86 |
| 2,783,327 | 2/57 | Luckey | 200—86 |
| 2,856,674 | 10/58 | Hill | 29—155.55 |
| 2,951,921 | 9/60 | Wikkerink | 200—86 |
| 2,954,600 | 10/60 | Schiffmann | 29—155.55 |

BERNARD A. GILHEANY, *Primary Examiner.*

RICHARD M. WOOD, ROBERT K. SCHAEFER,
*Examiners.*